Dec. 28, 1937. H. MAZZEO 2,103,860
MACHINE FOR PRODUCING RUBBER AND SIMILAR ARTICLES
Filed Dec. 12, 1936 6 Sheets-Sheet 1
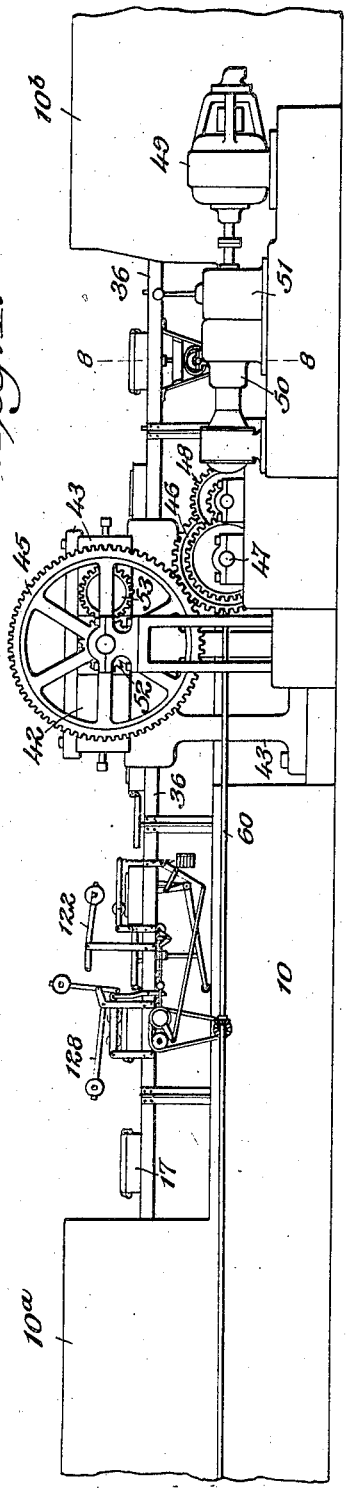
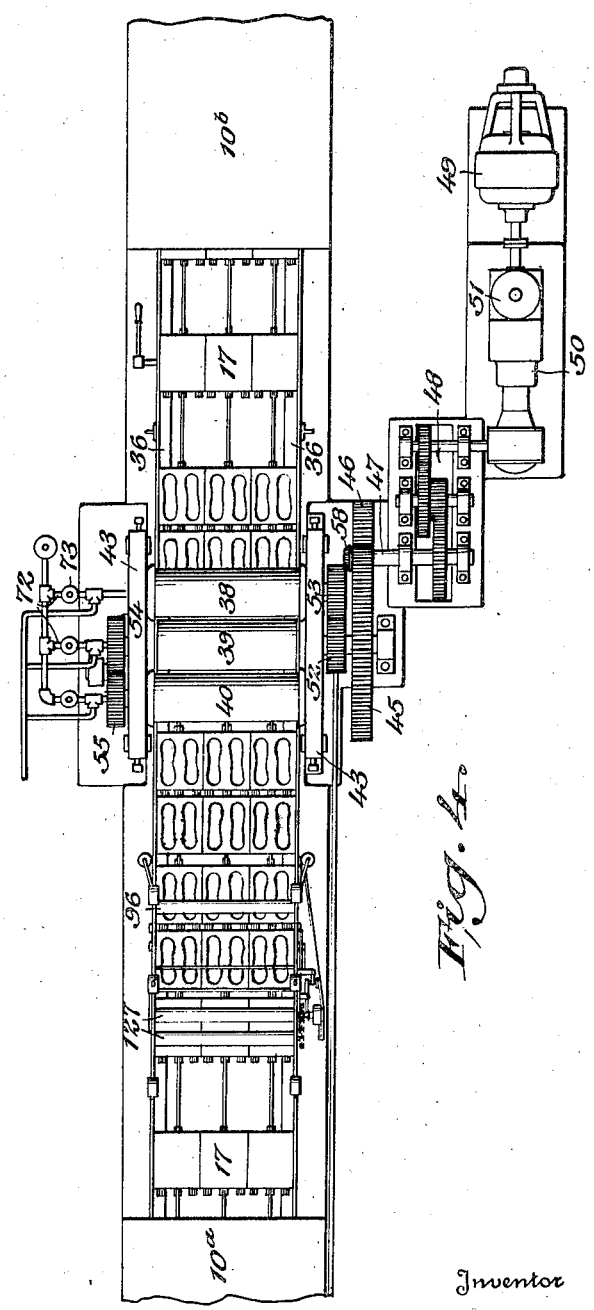
Inventor
*Hector Mazzeo,*
By
Attorney Dec. 28, 1937.  H. MAZZEO  2,103,860
MACHINE FOR PRODUCING RUBBER AND SIMILAR ARTICLES
Filed Dec. 12, 1936  6 Sheets-Sheet 2
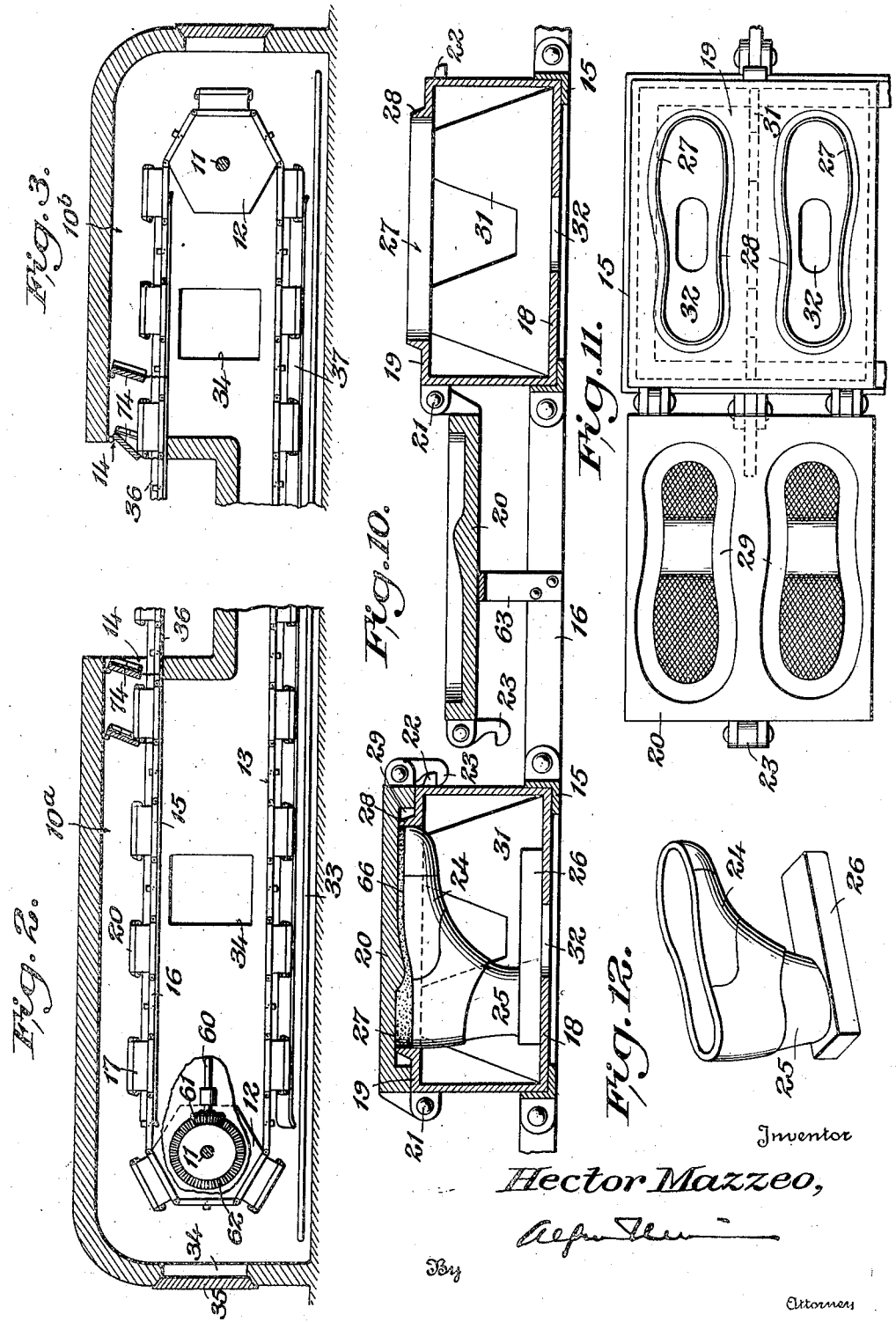
Inventor
Hector Mazzeo,
By
Attorney Dec. 28, 1937. H. MAZZEO 2,103,860
MACHINE FOR PRODUCING RUBBER AND SIMILAR ARTICLES
Filed Dec. 12, 1936 6 Sheets-Sheet 3

Inventor
Hector Mazzeo,
by
Attorney

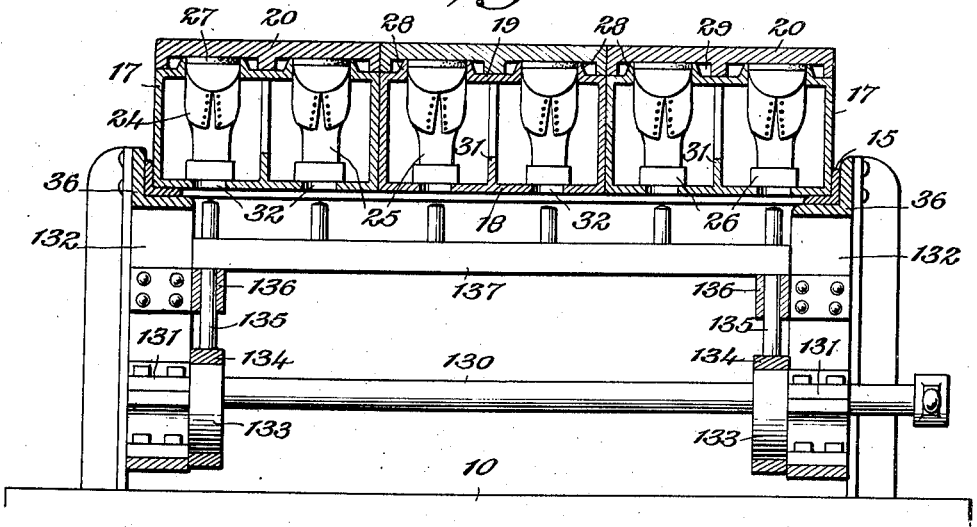
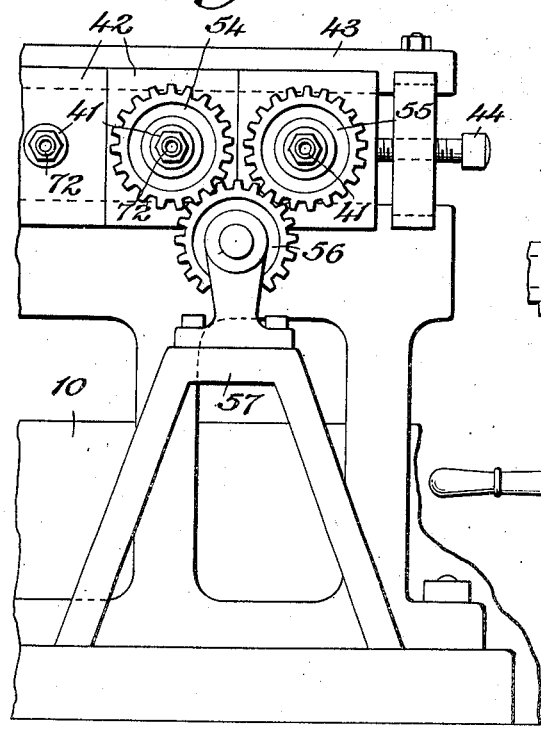
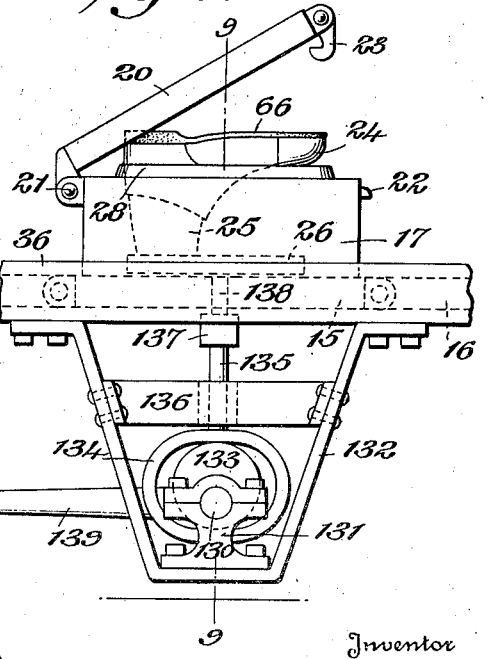

Dec. 28, 1937.   H. MAZZEO   2,103,860
MACHINE FOR PRODUCING RUBBER AND SIMILAR ARTICLES
Filed Dec. 12, 1936   6 Sheets-Sheet 5

Inventor
Hector Mazzeo,
By
Attorney

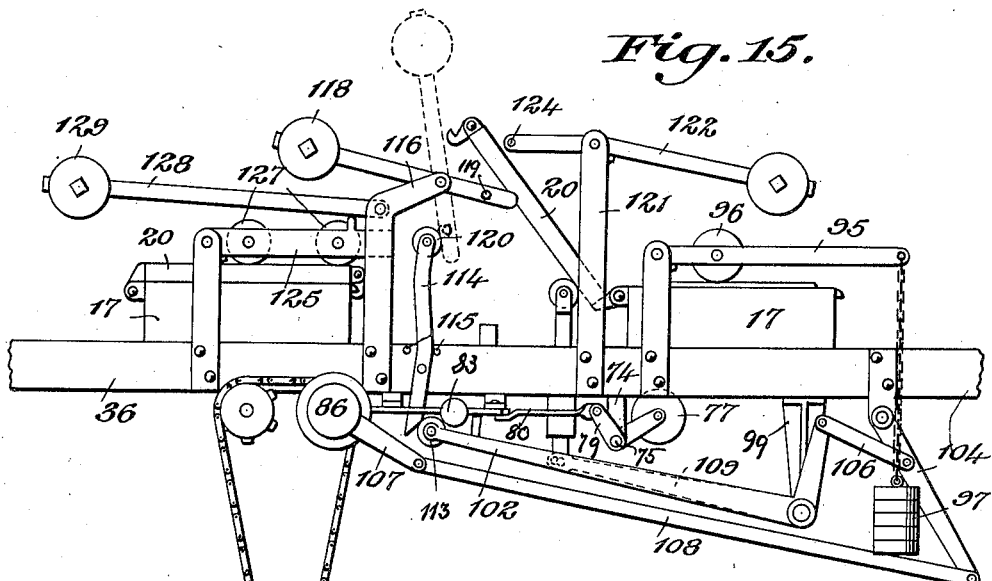
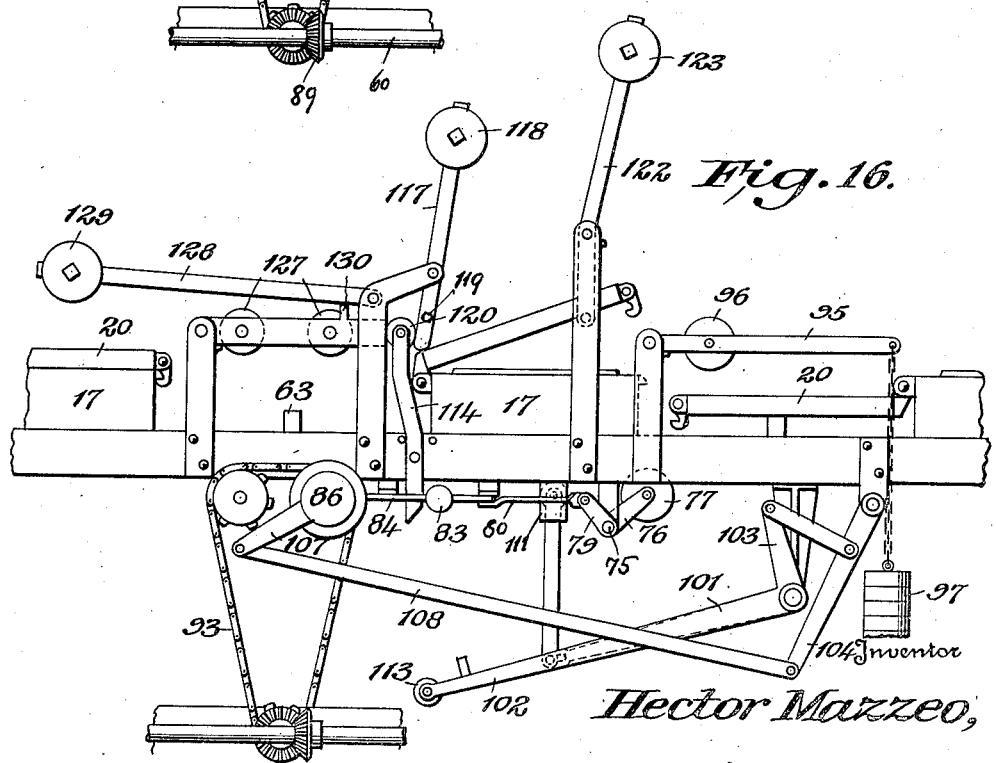

Patented Dec. 28, 1937

2,103,860

UNITED STATES PATENT OFFICE 2,103,860

MACHINE FOR PRODUCING RUBBER AND SIMILAR ARTICLES

Hector Mazzeo, Buenos Aires, Argentina

Application December 12, 1936, Serial No. 115,461

10 Claims. (Cl. 18—4)

This invention relates to a machine for use in the production of various articles formed entirely or in part of material which is plastic or moldable in its raw or original state and which requires thermal treatment to impart finished form thereto, and has generally in view to provide a continuously operable machine to perform successively various operations in the production of articles formed at least in part from such material, thereby to save labor, increase production and reduce production costs.

While a machine embodying some or all of the novel features of the invention may be employed in the production of various different articles, a special purpose of the invention is to provide a labor saving, production increasing, article standardizing and cost reducing machine for use especially in applying rubber soles to shoes. In this connection the invention has more particularly in view to provide a machine to have raw or unvulcanized rubber fed thereto and which is operable to shape such rubber into shoe sole form; to apply the formed soles to pre-formed shoe uppers and to vulcanize the soles upon the uppers.

According to the invention, an endless conveyor travels through an oven and carries mold boxes having hinged covers to permit insertion into the boxes of lasts carrying pre-formed shoe uppers to which rubber soles are to be applied and to permit removal from the boxes of the completed shoes after application of the soles to the uppers. In this connection special objects of the invention are: to provide a practical, efficient means to roll raw or unvulcanized rubber into sheet form and to cooperate with the mold boxes to cut the sheet into the form of shoe soles and to apply the unvulcanized soles to shoe uppers mounted on lasts contained in the mold boxes, all without waste of rubber; to provide novel means for thereafter closing the covers of the mold boxes, and to provide novel means for use in effecting opening of the covers and partial ejection of the completed shoes from the mold boxes following passage of the mold boxes through the oven.

With the foregoing and other objects in view, which will become more fully apparent as the nature of the invention is better understood, the same consists in the novel features of construction, combination and arrangement as will be hereinafter more fully described, illustrated in the accompanying drawings and defined in the appended claims.

In the drawings, wherein like characters of reference denote corresponding parts in the different views:—

Figure 1 is a side elevation of the medial portion of a machine constructed in accordance with one practical embodiment of the invention.

Figures 2 and 3 are longitudinal sections through the end portions of the machine, respectively.

Figure 4 is a top plan view of the medial portion of the machine shown in Fig. 1.

Figure 7 is an elevation of the mechanism shown in Figs. 5 and 6 looking toward the side thereof opposite the side shown in Fig. 1.

Figure 8 is an enlarged side elevation of the means for lifting articles from the mold boxes.

Figure 9 is a section on the line 9—9 of Fig. 8.

Figure 10 is an enlarged longitudinal section through a pair of the mold boxes.

Figure 11 is a top plan view of one of the mold boxes with the cover thereof open.

Figure 12 is a perspective view of one of the lasts showing a shoe thereon.

Figures 15 and 16 are views similar to Fig. 14 illustrating succeeding positions of the parts of the mold box cover closing means during closing of a cover.

Figure 5:
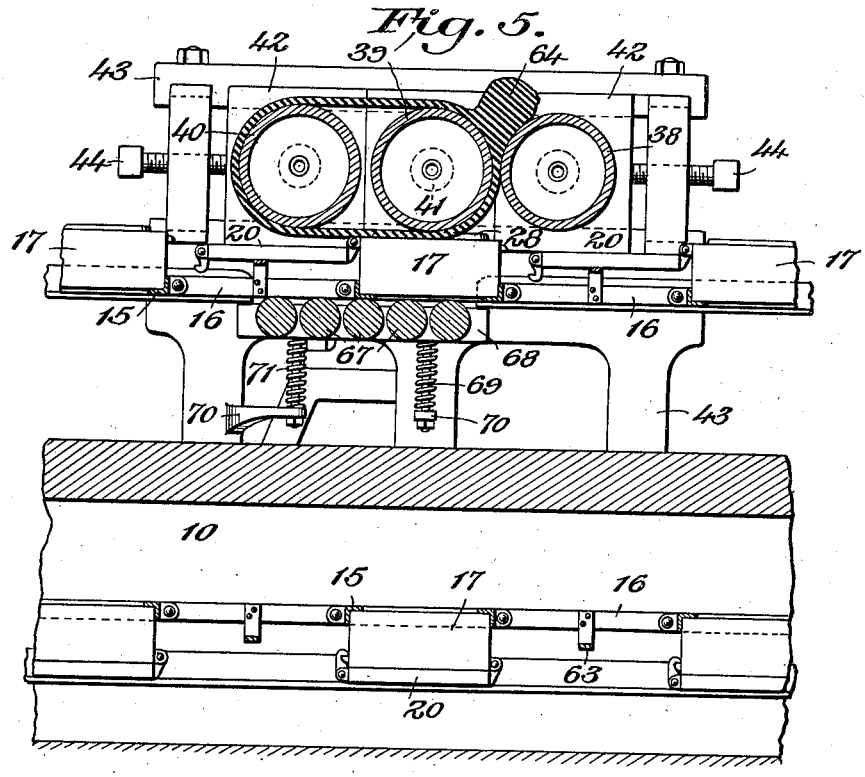
Figure 5 is a longitudinal section on an enlarged scale through the mechanism for applying unvulcanized rubber soles to shoe uppers contained in the mold boxes.

The present application is, in part, a continuation of my prior application, Serial No. 33,770 filed July 29, 1935, which application was abandoned.

Referring to the drawings in detail, 10 designates an oven which may be formed from any suitable material and which is of elongated form having, preferably, a medial portion of least height and receiving and delivery end portions 10ª, 10ᵇ, respectively of greater height.

Mounted in suitable bearings in the end portions of the oven 10 are horizontally disposed shafts 11, 11 which extend transversely of the oven and have mounted thereon sprocket wheels 12, 12, respectively, over which are engaged a horizontally disposed, endless conveyor designated generally as 13. As shown, the lower reach of this conveyor is disposed entirely within the oven 10. On the other hand, only the end portions of the upper reach are disposed within the oven, the medial portion of said upper reach being disposed above the top of the medial portion of the oven. In the walls defining the inner ends of the oven end portions 10ª, 10ᵇ are openings 14 to permit the passage of the upper reach of the conveyor into and from said oven end portions.

The conveyor 13 is composed of a plurality of rectangular angle iron frames 15 connected together in spaced apart relationship longitudinally of the conveyor by links 16.

In each of the angle iron frames 15 is mounted one or more mold boxes 17. That is to say, the conveyor 13 and, consequently, the frames 15, may be of a width so that each frame 15 may accommodate either a single mold box 17 or a plurality of mold boxes disposed in side to side relationship. In the present instance the frames 15 are arbitrarily illustrated as being of widths to accommodate three mold boxes which may be secured in said frames in any desired manner.

Each mold box 17 is closed at its sides and ends and includes a bottom wall 18, a top wall 19 and a cover 20 which is hinged, as indicated at 21, to the box proper at the lead end thereof as regards its direction of travel. On the other end of the box proper is a keeper 22 to be engaged by a latch element 23 on the cover to hold the latter closed.

In the present instance each mold box 17 is of a length and width to accommodate a pair of shoe uppers 24 mounted in side to side relationship on a pair of lasts 25 each carried by a base 26 seated upon the bottom wall 18 of the mold box, the said lasts 25 serving to support the shoe uppers with their bottoms facing upwardly and disposed neatly within sole-shaped openings 27 in the top wall 19 of the mold box. Surrounding each opening 27 and extending upwardly from the top wall 19 of the mold box is a flange 28, while formed in the inner face of the cover 20 are depressions 29 to accommodate said flanges 28, the bottoms of said depressions being formed according to the desired bottom contour and finish of the soles to be applied to the shoe uppers 24. Preferably the depressions 29 are of greater areas than the areas enclosed by the flanges 28 so that when the cover is closed, spaces 30 are provided in the cover outwardly of the flanges 28 to receive any excess rubber which may be applied to the bottoms of the shoe uppers and which may be extruded from between the bottoms of said uppers and the bottoms of the cover depressions 29 when the cover is closed. Preferably, too, the top wall of each mold box is supported between the openings 27 therein by a web 31 extending to the bottom wall 18 of the box and apertured or suitably formed for circulation of air therethrough. In the bottom wall of each mold box is a pair of openings 32, one underlying each opening 27 and covered by the base 26 of the related last 25, so that the said last bases may be engaged from beneath and lifted when the mold box covers are unlatched, thereby to raise said covers and project the shoes upwardly partially through the openings 27.

The oven 10 may be heated, or cooled, in any desired manner. In the present instance said oven is shown as being equipped with pipe coils 33 to have steam or any other suitable heating, or cooling, fluid circulated therethrough.

To afford access to the oven the same is provided at suitable points with openings 34 which normally are closed by doors or covers 35.

In order to support the upper and lower reaches of the endless conveyor 13 against sagging and for straight line horizontal movement, suitably supported rails 36 of angle iron or other suitable material span the space between the end portions 10ª, 10ᵇ of the oven 10 in overlying relationship to the low, medial portion of said oven and have the ends of the frames 15 of the upper reach of the conveyor resting thereon, and other rails 37 of angle iron or the like are suitably mounted within the oven and have the end portions of the covers of the outermost mold boxes of the lower reach of the conveyor resting thereon, it being noted in this latter respect that since the mold boxes of the upper reach of the conveyor are disposed with their covers uppermost, the mold boxes of the lower reach of the conveyor are inverted, or, in other words, are disposed with their covers facing downwardly.

Figure 6:
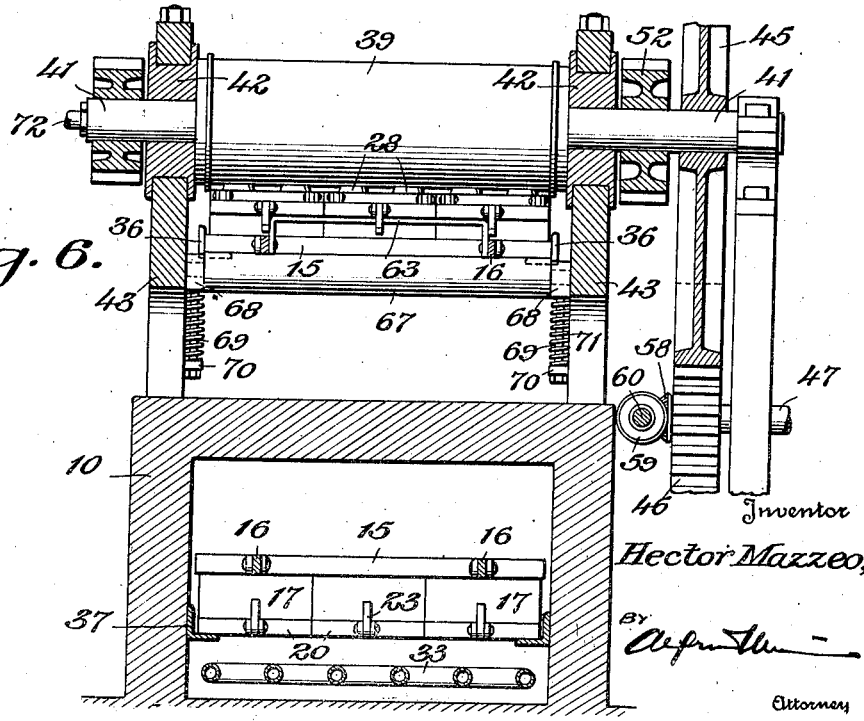
Figure 6 is a transverse section through the mechanism shown in Fig. 5.
Figure 13:
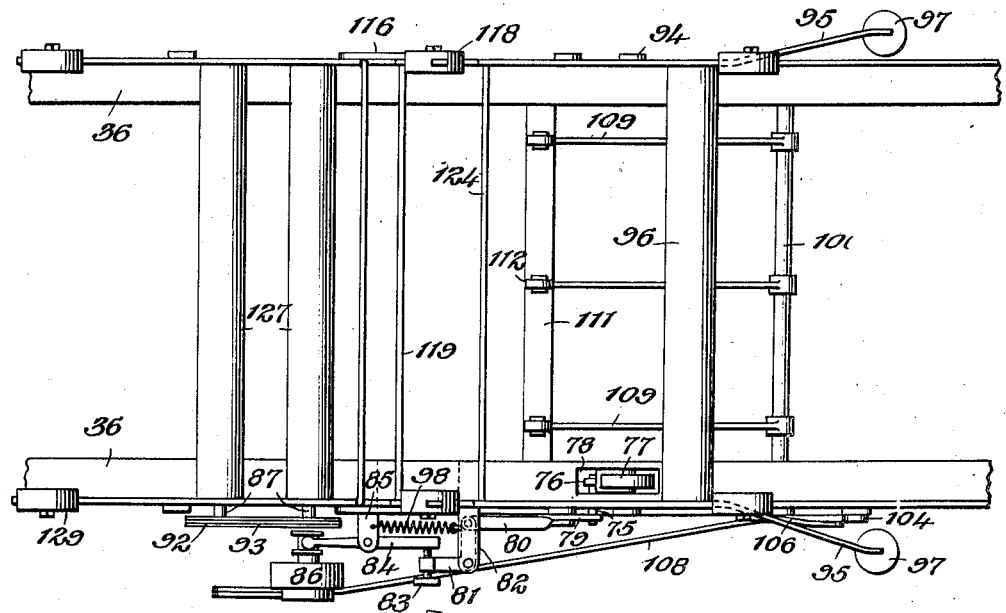
Figure 13 is an enlarged top plan view of the means for closing the covers of the mold boxes.

At a point approximately midway between the end portions 10ª, 10ᵇ of the oven 10 is located the mechanism for applying unvulcanized rubber soles to shoe uppers contained within the mold boxes 17. This mechanism, illustrated in detail in Figs. 5, 6, and 7, comprises three rollers 38, 39, and 40 disposed horizontally and extending transversely relative to the conveyor 13 above the upper reach thereof at such elevations that the bottoms of the last two rollers, 39 and 40, as regards the direction of travel of the conveyor, are in the plane, or substantially in the plane, of the upper edges of the flanges 28 of the underlying mold boxes 17, and the bottom of the first of said rollers, 38, is above said plane. Preferably, the rollers 39 and 40 are of equal diameter and the roller 38 is of smaller diameter so that their axes are disposed in a common horizontal plane. In any event, shafts 41 extend from the ends of said rollers and are journaled in blocks 42 which are mounted for sliding movement longitudinally with respect to the conveyor 13 in suitable frames 43 at opposite sides of the conveyor so that the spaced apart relationship of said rollers may be varied, desired adjustments of said blocks 41 being effected and maintained by means of set screws 44 threaded through the ends of the frames 43 and engaging the outermost blocks 42.

On the shaft 41 at one end of the middle roller 39 is fastened a relatively large gear wheel 45 with which meshes a smaller gear wheel 46 on a shaft 47 of a reduced speed train of gears 48 which are driven by an electric motor 49 through a further reduction gear 50 and a variable speed transmission gear 51, the said motor, variable speed transmission gear and reduction gears being mounted, for example, at one side of the oven 10 on a concrete or other suitable foundation.

Fastened to the same shaft 41 of the middle roller 39 which carries the large gear wheel 45 is a smaller gear wheel 52 which meshes with a similar gear wheel 53 on the shaft 41 at the related end of the roller 38, whereby the latter roller is driven oppositely to the roller 39. On the shaft 41 at the opposite end of the middle roller 39 is fastened a gear wheel 54 and on the shaft 41 at the adjacent end of the roller 40 is fastened a companion gear wheel 55. These two gear wheels 54 and 55 do not mesh with each other, but both mesh with an idler gear wheel 56 mounted on a support 57. Thus, the roller 40 is driven in the same direction as the roller 39.

On the shaft 47 of the reduced speed train of gears 48 is a bevel gear 58 which meshes with a companion bevel gear 59 on a shaft 60 which is rotatably mounted in suitable bearings at one side of the oven 10 and carries a second bevel gear 61 (Fig. 2) meshing with a companion bevel gear 62 on one of the conveyor shafts 11, whereby the latter shaft and the conveyor are driven in unison with the rollers 38, 39, and 40.

If desired, a clutch may be interposed in the shaft 60 so that the conveyor 13 may be started and stopped at will during continuous operation of the motor 49 and rotation of the rollers 38, 39, and 40.

As will be understood, the gearing described is such that the rollers 39 and 40 are driven at the same peripheral velocity as the conveyor 13 and in directions such that they roll against the underlying flanges 28 surrounding the mold box openings 27 as the mold boxes, with their lids swung entirely open and resting upon supports 63 carried by the links 16, pass beneath said rollers.

Unvulcanized rubber 64 is fed between the rollers 38 and 39 from a hopper or in any other suitable or desired manner. In passing between said rollers it is rolled into the form of a sheet which, after once having been started around the rollers 39 and 40 in the form of a band 65, continues in this form as more rubber is fed between the rollers 38 and 39 and rubber is taken from the band to furnish soles for shoe uppers contained in the mold boxes 17. As each mold box passes beneath the roller 39 the sheet 65 of rubber is laid upon the top of the mold boxes and because of the shearing cooperation of said roller 39 with the upper edges of the flanges 28, sole sections 66 are cut from the sheet 65 and are pressed, first by the roller 39 and again by the roller 40, into the openings 27 in the tops of the mold boxes upon the bottoms of the shoe uppers disposed in said openings. As the mold boxes pass successively beneath the rollers 39, 40, the band of rubber 65 travels around said rollers and the voids formed therein by the removal of the sole sections 66 therefrom are refilled with the constantly or periodically supplied rubber 64. In this way practically all waste of rubber is avoided, since all rubber not taken from the band 65 for forming the soles is returned by said band to the supply rubber 64, and because the rollers 38 and 39 may be adjusted so that the thickness of the band 65 and, consequently, of the sole sections 66 cut therefrom, is exactly the thickness required to fill the tops of the openings 27 above the bottoms of the shoe uppers. If, however, excess rubber should be supplied to any one or more of the mold boxes and should be extruded from the openings 27 of the mold box by the cover when the latter is closed, such excess rubber is readily accommodated by the spaces in the cover outwardly of the flanges 28.

In order to assure effective shearing cooperation between the roller 39 and the upper edges of the flanges 28 of the mold boxes 17, means is provided whereby the mold boxes are yieldably urged upwardly against said roller as they pass therebeneath. In the present instance this means comprises a series of horizontal rollers 67 disposed transversely of the machine in underlying relationship to the rollers 39 and 40 and constituting supports for the endless conveyor 13 at this location. At their ends said rollers 67 are rotatably mounted in bearing members 68 which are suitably mounted for vertical movement, as, for example, by means of rods 69 depending therefrom through lugs 70 on the frames, and which are supported on, and urged constantly upwardly by, suitable springs 71, as, for example, coil springs engaged on the rods 69 and interposed between said bearing members 68 and the lugs 70. The constant tendency of the springs 71 is, of course, to urge the rollers 67 and, consequently, the endless conveyor 13 and the mold boxes 17, upwardly to press the flanges 28 of the mold boxes against the rollers 39 and 40 as the mold boxes pass beneath said rollers. In this way an effective shearing action between the rollers 39 and 40 and the flanges 28 of the mold boxes obviously is assured, even in the case of any slight manufacturing variations in the vertical dimensions of the successive mold boxes.

It is desirable that the rollers 38, 39 and 40 shall be heated, or cooled, depending upon the nature of the plastic material employed and the particular use of the machine, to assist in maintaining a proper condition of the plastic material, and any suitable means may be provided for this purpose. In the present instance the rollers 38, 39 and 40 are illustrated as being hollow and as having connected therewith, through the shafts 41 at adjacent ends thereof, pipes 72 through which they may be supplied with any suitable heating, or cooling, fluid. It may be presumed in the present instance that steam is supplied through the pipes 72 to heat said rollers, in which connection it will be observed that said pipes have branch pipes leading therefrom for carrying off condensate. In the pipes 72 are valves 73 for independently controlling the supply of heating, or cooling, fluid to the individual rollers.

Between the receiving end portion 10ª of the oven 10 and the sole applying mechanism just described is a mechanism, illustrated in detail in Figs. 13 to 16 of the drawings, which is rendered effective by advance of the mold boxes to close the covers 20 thereof, and which now will be described in detail.

In a suitable fixed support, such as a bearing member 74 secured to and depending from one of the rails 36, is rotatably mounted a short, horizontally disposed, transversely extending shaft 75 on which is secured an arm 76 carrying a roller 77 which is upwardly movable through an opening 78 in the bottom flange of said rail 36 to a position in which its top is disposed a short distance above the upper face of said bottom flange, and which is downwardly movable to a position in which its top is disposed flush with the upper face of said bottom flange. Also secured on said shaft 75 is a second arm 79 which is connected by a link 80 with one arm of a horizontally disposed bell-crank lever 81 which is pivoted to a suitable fixed support 82 and which has threaded in its other arm an adjusting screw 83 cooperating with one end of a clutch operating lever 84 which is pivoted intermediately to a suitable fixed support 85 and has its other end operatively engaged with a clutch illustrated conventionally and designated generally as 86.

The clutch 86 is mounted at one end of one of a pair of horizontal parallel transversely extending shafts 87 which carry rollers 88 suitably spaced from the roller 77 in the direction of travel of the mold boxes 17 and extending between the guide rails 36 with their upper faces disposed substantially flush with the upper faces of the bottom flanges of said guide rails so as to constitute supports for the mold boxes as the latter pass thereover.

On the shaft 60 is a small bevel gear 89 which drives a small bevel gear 90 on a suitably mounted horizontal shaft carrying a sprocket wheel 91, and trained over said sprocket wheel 91 and over sprocket wheels 92 on the roller shafts 87 is a sprocket chain 93 whereby the rollers 88 are driven by said shaft 60 in directions to assist in advancing the mold boxes 17.

At each side of the machine is a suitable fixed support such, for example, as an arm 94 secured to and rising from the related guide rail 36, and on each of said supports is pivotally mounted at one end an arm 95. Extending between and rotatably supported by the arms 95 is a roller 96 the purpose of which is to ride against the flanges 28 of each mold box 17 as each mold box approaches and engages the roller 77, and to exert downward pressure upon the mold boxes, thereby to assure depression of the roller 77 by each successive mold box as it passes over said roller 77. To this end, the arms 95 carry weights 97 at their free ends, or otherwise are yieldably urged downwardly, but, at the same time, said arms are suitably limited in their downward movement so that when any given mold box has passed beneath the roller 96 and the latter is vertically alined with the space between a pair of the mold boxes, said roller is disposed to ride upon the top of the next mold box as the mold boxes advance.

Any suitable yieldable means may be provided to urge the roller 77 constantly upwardly, said means comprising, for example, a contractile coil spring 98 connected at one end to a suitable fixed support, such as the support 85, and at its other end to the arm of the bell-crank lever 81 to which the link 80 is connected.

Mounted in suitable fixed supports such, for example, as bearing arms 99 depending from the guide rails 36, is a horizontal, transverse shaft 100 which extends from side to side of the machine below the guide rails 36 and has fixed thereto a bell-crank lever 101 having long and short arms 102 and 103, respectively, the former of which extends from said shaft 100 in the direction of travel of the mold boxes and is vertically swingable, and the latter of which extends substantially vertically and is horizontally swingable. Adjacent to said bell-crank lever 101 is a lever arm 104 which is pivoted at one end to a suitable fixed support, such as a bearing member 105 secured to one of the guide rails 36, and which is connected at an intermediate point with the short arm 103 of the bell-crank lever 101 by a link 106. The clutch 86 includes an arm 107, and connecting said clutch arm with the free end of the lever arm 104 is a rod 108.

The clutch 86 normally is disengaged and is disengaged when the roller 77 is in its upper position. When, however, the roller 77 is depressed the bell-crank lever 81 is swung to cause the screw 83 to press against the lever 84 and rock said lever to effect engagement of said clutch.

Figure 14:
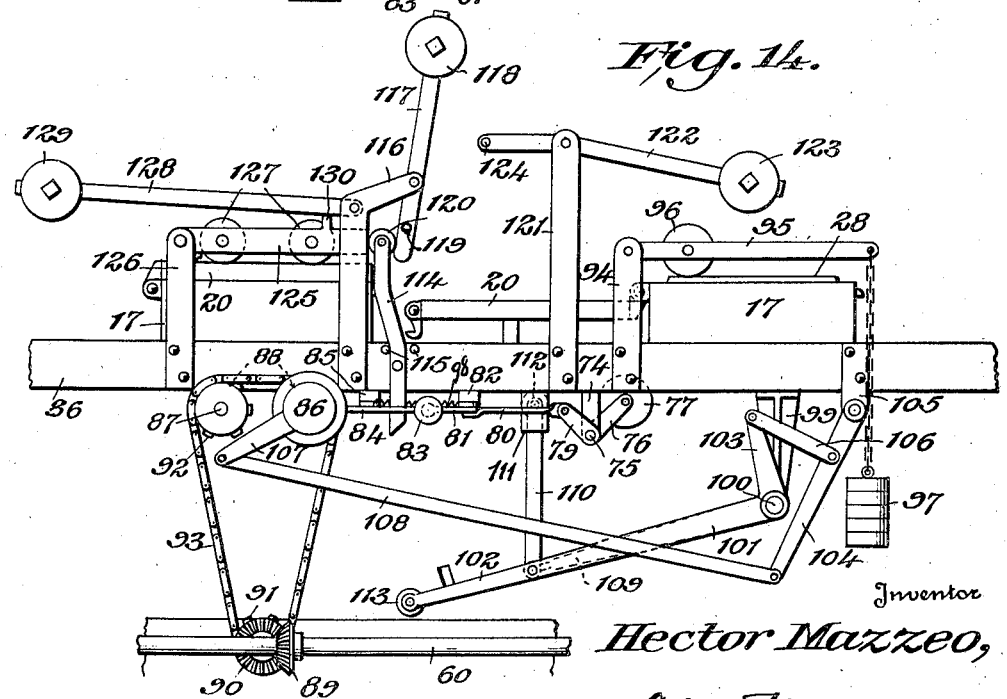
Figure 14 is a side elevation of the means shown in Fig. 13, illustrating the positions of the parts of said means just prior to initiation of operation of said means to effect closing of a mold box cover.

Either by means of a weight or a spring or by the inherent weight of the long arm 102 of the bell-crank lever 101, said bell-crank lever tends constantly to swing downwardly to the position shown in Figs. 14 and 16. Accordingly, when the clutch 86 is disengaged the bell-crank lever 101 and its connections with the clutch 86 assume the positions shown in Figs. 14 and 16. In other words, the long arm 102 of the bell-crank lever 101 is in its lowermost position and the clutch arm 107 is in nearly a horizontal position extending from the clutch in the direction of travel of the mold boxes. Thus, it follows that when the roller 77 is depressed with consequent engagement of the clutch 86, the clutch arm 107 is swung counter to the direction of travel of the mold boxes with consequent rotation of the shaft 100 and upward swinging movement of the long arm 102 of the bell-crank lever 101.

Fixed on the shaft 100 is one or more arms 109, the number depending upon the number of mold boxes disposed in side to side relationship in any particular machine. Since the present machine is of three mold box width, there are, in the present instance, three of the arms 109, one for each of the side by side mold boxes. These arms extend from the shaft 100 in the direction of travel of the mold boxes and at their free ends are articulated to the lower ends of vertically disposed mold box cover lifting rods 110 which are guided for vertical movement in a suitable guide member 111 and which carry rollers 112 at their upper ends for engagement with the mold box covers. As shown, said rods 110 are suitably spaced from the roller 77 in the direction of advance of the mold boxes so as to be disposed to engage beneath and lift the mold box covers when the roller 77 is depressed with consequent engagement of the clutch 86 and consequent rotation of the shaft 100 by the connection between the clutch and said shaft.

Carried by the long arm 102 of the bell-crank lever 101 is a roller 113, and pivotally mounted at an intermediate point on a suitable fixed support such, for example, as one of the guide rails 36, is an arm 114 which is substantially vertically disposed and which is capable of limited swinging movement between a pair of stops 115.

At each side of the machine is a suitable fixed support 116, and pivoted at an intermediate point on each of said supports, above the guide rails 36, is an arm 117. Normally said arms are disposed at slight upwardly and rearwardly inclined positions as regards the direction of advance of the mold boxes, as illustrated in Figs. 14 and 16. At their upper ends they are weighted, as indicated at 118, and at their lower ends they are connected together by a rod 119.

The arm 114 is disposed in the plane of one of the arms 117 and its upper end extends slightly above the lower end of said arm 117 when the latter is in its normal position, the said upper end of said arm 114 being disposed at the forward edge of the arm 117 as regards the direction of advance of the mold boxes and carrying a roller 120 for cooperation with said arm 117. Since the arms 117 normally are disposed at slight inclinations as stated, the arm 117 related to the arm 114 engages the roller 120 and holds the arm 114 in a substantially vertically disposed position with its upper and lower ends swung to their limits of movement forwardly and rearwardly, respectively, as regards the direction of advance of the mold boxes.

The lower end of the arm 114 is beveled and is disposed in the path of movement of the roller 113 at the free end of the long arm of the bell-crank lever 101. Consequently, when the long arm of the bell-crank lever 101 is swung from its lowermost to its uppermost position, the roller 113 engages the bevelled lower end of the arm 114 and swings the said lower end of said arm in the direction of advance of the mold boxes. This results in swinging of the upper end of the arm 114 in the opposite direction and consequent swinging movement of the lower end of the related arm 117 in the same direction past a vertical position, whereupon the weights 118 become effective to tend to continue such swinging movement of the arms 117 and of the rod 119. This action obviously occurs after the mold box covers have been partially lifted by the rods 110. Consequently, when the arms 117 and the rod 119 are swung by the arm 114, the rod 119 swings beneath the mold box covers so that any continued swinging movement of the arms 117 by the weights 118 effects further lifting of the mold box covers.

At each side of the machine is a suitable support 121, and on each of said supports is pivoted at an intermediate point a normally substantially horizontally disposed arm 122. The shorter ends of these arms extend from the pivots of said arms in the direction of advance of the mold boxes and the longer ends of said arms, which are weighted as indicated at 123, extend in the opposite direction from their pivots, any suitable stop means being provided to limit swinging movement of the longer ends of said arms by the weights 123 beyond positions in which the shorter ends of said arms are disposed substantially horizontally.

The shorter ends of the arms 122 are connected together by a rod 124, and when said arms are disposed in their normal positions shown in Figs. 14 and 15, the rod 124 is disposed in the path of upward swinging movement of the cover of a mold box passing over the roller 77 and holding the same depressed. Thus, following elevation of the covers of a bank of the mold boxes by the rods 110, and after the rod 119 has been swung beneath said covers, continued advance of the mold boxes results in the covers riding against the rod 119 and being moved toward vertical positions until they engage the rod 124. When this occurs the covers, due to continued advance of the mold boxes, fulcrum against the rod 124 and thereby return the arms 114 and the rod 119 to their starting or normal positions, and as the mold boxes continue their advance the covers reach and finally pass vertically positions, whereby they tend to gravitate to closed positions. However, instead of the covers immediately falling to completely closed positions, their closing is arrested by the rod 124 which swings downwardly under the weight of the covers with consequent elevation of the weights 123 so that the covers are eased toward closed positions and do not drop from the rod 124 to completely closed positions until, by continued advance of the mold boxes, they have so far been eased to closed positions that they drop gently closed. The arms 122 and the rod 124 then swing to their normal or starting positions and the mechanism is restored to condition to repeat the closing of the covers of the next set of mold boxes.

The rollers 88 are positioned so that the mold boxes pass onto the same at approximately the time their covers reach fully closed positions, and at this time means operate to effect downward pressure upon the covers to assure their complete closing.

The pressure means referred to comprises a pair of arms 125, one at each side of the machine, pivoted at corresponding ends to suitable fixed supports, such, for example as arms 126 secured to and rising from the guide rails 36, and carrying a pair of rollers 127 approximately vertically alined with the rollers 88. To other suitable fixed supports such, for example, as the supports 116, are pivoted arms 128, one at each side of the machine, which arms are weighted as indicated at 129 and bear downwardly against lugs or pins 130 rising from the arms 125 near their free ends.

Downward movement of the arms 125 and of the rollers 127 carried by said arms, is limited in any suitable manner so that the rollers 127 may not swing so far downwardly as to interfere with advance of the mold boxes. However, said arms are free to swing downwardly to positions in which the rollers 127 by riding upon the tops of the mold box covers and exerting downward pressure thereagainst, assure complete closing of said mold box covers. Accordingly, following easing of the mold box covers to closed positions by the rod 124, the rollers 127 act to press said covers to completely closed positions, whereupon the latches 23 automatically engage with the keepers 22.

Following closing of the covers of the mold boxes the latter pass into the receiving end portion 10$^a$ of the oven 10 through the opening 14 in said end portion, thence through the oven where vulcanization of the soles 66 takes place, and from the delivery end portion 10$^b$ of the oven through the opening 14 thereof. In this connection, in order to reduce loss of heat from the oven through the openings 14, pairs of flaps are hung from the top walls of said oven portions 10$^a$, 10$^b$ to tend to close said openings and to be successively engaged and raised by the mold boxes as they pass into and from said openings.

Between the sole applying mechanism and the delivery end portion 10$^b$ of the oven is a mechanism for manual manipulation to effect partial raising of the mold box covers and partial ejection of the lasts 25 with the completed shoes thereon, thereby to facilitate manual complete opening of said covers and complete removal of the lasts and shoes from the mold boxes. In the present instance this mechanism comprises a horizontal shaft 130 extending transversely of the machine below the upper reach of the endless conveyor 13 and rotatably mounted in bearings 131 supported by substantially U-shaped brackets 132 depending from the conveyor supporting rails 36. On said shaft is a pair of cams 133 with which are engaged yokes 134 having upwardly extending rods 135 guided for vertical movements in bearing members 136 carried by the brackets 132. Carried by the rods 135 is a horizontal bar 137 which is disposed transversely of the machine directly beneath the upper reach of the endless conveyor 13 and which has extending upwardly therefrom a series of pins 138 so spaced as to aline with the openings 32 in the bottoms of the mold boxes as the latter pass over said bar 137. On the shaft 130 is a lever 139, hand wheel or the like for rotating said shaft and the cams carried thereby, thus to effect raising and lowering of the yokes 134 and the bar 137. When the bar 137 is in its lowermost position as shown in Figs. 8 and 9, the upper ends of the pins 138 are disposed below the frames 15 of the conveyor 13 so as not to interfere with travel of said conveyor. On the other hand, when the bar 137 is raised, the pins 138 are projected upwardly sufficiently to enter the openings 32 in the bottoms of the mold boxes and to engage and lift the lasts 25.

The conveyor 13 travels slowly and the openings 32 are elongated in the direction of travel of said conveyor, which permits time within which to manipulate the lever 139 to project the pins 138 when the mold box openings 32 become alined with said pins during advance of the mold boxes. In this connection it is understood that the operator has previously released the latches 23 so that the mold box covers are free to swing upwardly and that by upward projection of the lasts 25 the covers are partially raised as illustrated in Fig. 8 so that they may easily be swung to fully open positions as illustrated at the right hand end of Fig. 10. It is also understood that partial ejection of the lasts 25 from the mold boxes greatly facilitates their complete manual removal. It is further understood that before the open mold boxes reach the sole applying mechanism, other lasts with shoe uppers thereon are placed in said mold boxes so that the machine may operate continuously.

Without further description it is thought that the construction, operation and advantages of the invention will be clearly understood. It is desired to point out, however, that while only a single specific embodiment of the invention for a single definite purpose has been illustrated and dedscribed, the same obviously is capable of embodiment, either entirely or in part, in various different mechanical structures for uses other than applying rubber soles to shoe uppers within its spirit and scope as defined in the appended claims.

I claim:—

1. A machine of the character described comprising a series of mold boxes having hinged covers provided with mold cavities, means for moving said mold boxes in an endless path, means for feeding moldable material to said mold boxes, while the covers thereof are open, means rendered operable by movement of said mold boxes to swing the covers thereof toward closed positions and to press said covers to completely closed positions, and a thermal treatment chamber through which the mold boxes travel while moving in their endless path.

2. In a machine of the character described, a series of mold boxes having openings surrounded by outstanding flanges, means for moving said mold boxes in an endless path, a pair of rollers disposed transversely with respect to the path of movement of said mold boxes and in a plane parallel to a portion of said path of movement, both of said rollers being disposed to engage the outer edges of said mold box flanges as the mold boxes pass said rollers, means for driving said rollers so that their surfaces adjacent to the mold boxes travel in the same direction as the mold boxes, a third roller disposed parallel to and in advance of said pair of rollers as regards the direction of travel of the mold boxes, said third roller being disposed so as not to contact with the mold box flanges, means for driving said third roller oppositely with respect to the direction of rotation of said first mentioned rollers, said third roller being spaced from the adjacent roller of said pair of rollers to roll into sheet form moldable material supplied between said third roller and said adjacent roller, the said sheet of material being in the form of an endless band extending around said pair of rollers.

3. In a machine of the character described, a series of mold boxes having hinged covers, means for moving said mold boxes in an endless path, means for supplying moldable material to said mold boxes while the covers thereof are open, and means comprising a plurality of cooperating levers operable in response to movement of said mold boxes through a portion of their endless path of movement to swing the covers thereof substantially to closed positions.

4. In a machine of the character described, a series of mold boxes having hinged covers, means for moving said mold boxes in an endless path, means for supplying moldable material to said mold boxes while the covers thereof are open, means comprising a plurality of cooperating levers operable in response to movement of said mold boxes through a portion of their endless path of movement to swing the covers thereof substantially to closed positions, and means operable in response to continued movement of said mold boxes to exert pressure on the covers thereof to move them to completely closed positions.

5. In a machine of the character described, a series of mold boxes having hinged covers, means for moving said mold boxes in an endless path, means for supplying moldable material to said mold boxes while the covers thereof are open, means for supporting said mold boxes during movement thereof through a part of their endless path, a portion of said supporting means being depressible by said mold boxes, and means operable in response to depression of said depressible portion of said means and to movement of said mold boxes in their endless path to close the covers thereof.

6. The combination as set forth in claim 5 in which the cover closing means comprises coacting levers to lift the covers and other levers to swing the covers from their lifted positions to closed positions.

7. The combination as set forth in claim 5 including roller means to press to covers to fully closed positions after they have been swung to substantially closed positions by the cover closing means.

8. A machine of the character described comprising an elongated chamber, means for regulating the temperature of said chamber, an endless conveyor having upper and lower reaches of which the lower reach travels in said chamber and the upper reach travels above a portion of said chamber, mold boxes carried by said conveyor and having covers, means for supplying moldable material to said mold boxes as they move along a medial portion of the path of the upper reach of the conveyor, means for thereafter closing the covers, and manually operable means for partially opening the covers and partially ejecting formed articles from the mold boxes after they have passed through said chamber and prior to the same reaching the means for supplying moldable material thereto.

9. A machine as set forth in claim 8 including means to press the covers of the mold boxes to fully closed positions following closing of said covers by said cover closing means.

10. A machine as set forth in claim 8 in which the cover closing means comprises a plurality of cooperating levers actuated by the advancing mold boxes to swing the covers upwardly and to ease them toward closed positions.

HECTOR MAZZEO.